Feb. 6, 1962   E. N. SHAWHAN ET AL   3,020,470
SUBMERGED BODY DETECTION SYSTEM
Filed June 4, 1943   4 Sheets-Sheet 2

Inventors
E. N. SHAWHAN
A. C. MC LEAN
H. PALEVSKY
R. L. MATHER

By Stone E Bush
Attorney

United States Patent Office 3,020,470
Patented Feb. 6, 1962

3,020,470
SUBMERGED BODY DETECTION SYSTEM
Elbert N. Shawhan, Minneapolis, Minn., Arnold C. McLean, Tawas City, Mich., Harry Palevsky, Chicago, Ill., and Robert L. Mather, Clarksville, Iowa
Filed June 4, 1943, Ser. No. 489,726
23 Claims. (Cl. 324—3)
(Granted under Title 35, U.S. Code (1952), sec. 266)

This invention relates to a system for detecting bodies submerged in a conductive fluid and more particularly to a system for detecting bodies submerged in water, such as mines, lost torpedoes, anchors, diving bells, buried bombs, unexploded depth charges and wrecks whether such bodies are made of ferrous or non-ferrous metals or of a material which is non-metallic.

In systems heretofore proposed an induction balance has been employed for this purpose by mounting it on a vessel which traverses the area of the body of water suspected of having the object to be detected submerged therein. Induction balances utilize the well known fact that generated alternating electromagnetic fields induce secondary fields in any conducting body which they permeate. Such induction balances comprise a primary coil supplied from a source of alternating current and one or more secondary coils so arranged with respect to the primary coil that the secondary coil or coils will not be linked by the primary flux. However, the secondary electro-magnetic field induced in the conducting body as the induction balance passes in proximity thereto, links the secondary coils and induces a field therein. If a suitable indicating instrument is operatively connected to the secondary coils, it will be possible to determine the fact that a conducting body is located nearby by the deflections of the indicating instrument when such secondary field links the secondary coils.

The prior art systems have a number of disadvantages. For instance, such systems are incapable of discriminating between ferrous and non-ferrous metals as the primary winding will induce a secondary field in a metal regardless of its composition. Another disadvantage is that such systems are unable to detect the presence of non-metallic bodies nor are they suitable for detecting either metallic or non-metallic bodies submerged in water because the prior art systems are not sufficiently compact to be towed through the water on a reasonably small supporting means at a distance from the towing vessel which is sufficient to preclude the metal of the vessel from affecting the results. A further disadvantage of the prior art devices is that where a large area is to be covered and several of the devices are to be used simultaneously, it is difficult to eliminate cross pick-up between the several devices. Furthermore, the prior art devices are unable to discriminate between long period transients and the desired signal to be detected.

In general, in a system of the character comprising the present invention, a hydrofoil is provided which is adapted to be towed through a body of water below the surface thereof into proximity with a submerged body to be detected, the hydrofoil being provided with a primary winding energized from a source of alternating current and two overlapping secondary windings, one of which is more closely coupled to the primary coil than is the other. The two secondary coils have the outputs induced therein by the primary coil connected in opposition to a network which is provided with means whereby the phases and the magnitudes of the output voltages of the two coils may be substantially balanced. Because of the difference in coupling between each of the secondary coils and the primary coil, the induced secondary field which emanates from a submerged metallic body will link both secondary coils in a manner to produce addition of the voltages induced therein by the secondary field.

It has been found that the secondary field varies in phase from the phase of the primary field depending on whether the submerged body from which the secondary field emanates is of ferrous or non-ferrous metal or is non-metallic in character. Means is, therefore, provided for connecting the output of the aforesaid network to a phase shifting circuit and, by properly adjusting said phase shifting circuit, it will be possible to determine whether the submerged body to be detected is of either ferrous or non-ferrous metal or is non-metallic in composition.

The output of the phase shifting circuit is connected to a vacuum tube arrangement which operates as a phase discriminator thereby to produce different responses in accordance with differences in the phase of the output of the phase shifting circuit with respect to the phase of the voltage supplied to the primary coil. The output of this vacuum tube arrangement is supplied to a network which will respond only to an actual signal and will not respond to long period transients because of the operation of a feed-back circuit therein. The output of the network, after proper amplification, operates a recording device to indicate the presence of a submerged body and also the character thereof in accordance with the setting of the phase shifting circuit. The system is also provided with means to oppose the flow of any transient frequencies which may appear in said network.

One of the objects of the present invention is the provision of a new and improved system for the detection of submerged bodies possessing all of the advantages of systems heretofore proposed for this purpose and in which the aforesaid disadvantages have been eliminated.

Another object is the provision of an apparatus which is more compact than those heretofore proposed and, therefore, is adapted to be readily mounted on a towed hydrofoil.

Another object of the invention is to provide a system of the character disclosed in which it is possible to locate any metallic body immersed in a medium of different conductivity.

Another object of the invention is the provision of means for locating a non-conducting body immersed in a conducting medium.

An additional object of the invention resides in a novel and improved arrangement whereby the presence of ferrous and non-ferrous metallic bodies may be detected in air or water by the deflection of a meter as the bodies are approached.

A further object of the present invention is to provide a system for indicating the presence of non-conducting bodies in salt water as such bodies are approached.

Still another object of the invention is the detection and identification of metallic objects as either ferrous or non-ferrous by means of a phase sensitive indicating system.

Another of the objects of the present invention resides in the provision of a device which contains no ferrous material and consequently does not disturb the constant magnetic field around the object to be located.

Another object of the invention is the provision of novel and improved means to balance the phase and voltage of the output of two secondary coils employed in the system.

A further object of the present invention is to provide means for easily selecting respectively different control frequencies when two or more hydrofoils are employed for detecting submerged bodies over a wide area.

A further object of the invention is the provision of a novel and improved system including means therein for reducing the effect of long period transients appearing within the system.

Still another object is to provide means for eliminating the effect on the detection system of power frequencies employed on the towing craft or by the detection systems which are simultaneously in operation.

Still other objects, advantages and improvements will become apparent from the following detailed description taken in connection with the accompanying drawings in which.

Figure 1:
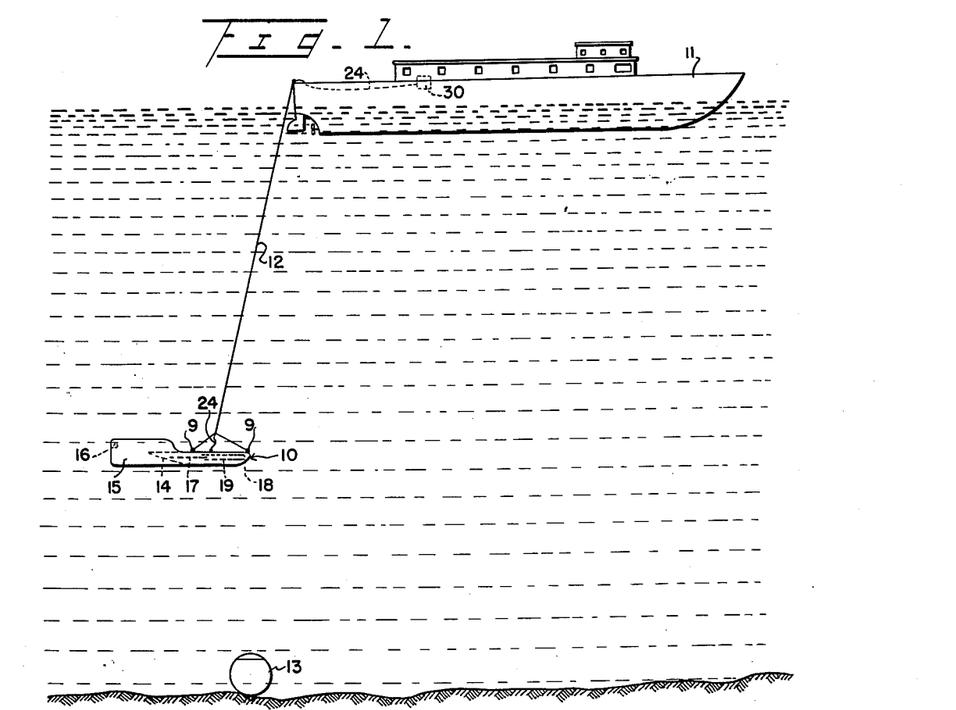
FIG. 1 is a view of a complete system suitable for use with the invention and employing a towed hydrofoil submerged below the surface of a body of water and capable of detecting a body resting on the bed thereof.
Figure 2:
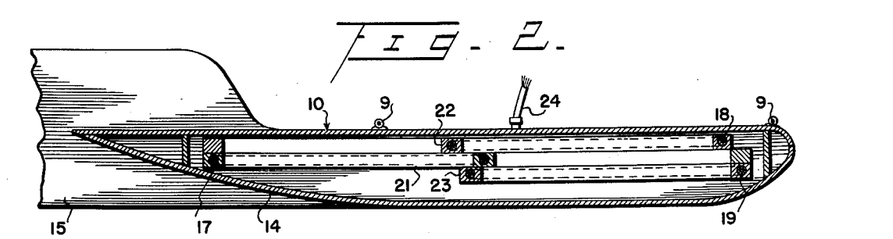
FIG. 2 is a sectional view of the hydrofoil showing the arrangement of the primary and secondary coils carried thereby.

Referring now to the drawings in which like numerals of reference are employed to designate like parts throughout the several views, there is shown in FIG. 1 an apparatus suitable for detecting the presence of submerged bodies. This apparatus comprises a hydrofoil shown generally by the numeral 10 towed by a vessel 11 by means of a cable 12 through the body of water in which the presence of a submerged body 13 is to be detected. The hydrofoil 10 has a body portion 14 provided with eyebolts 9 to which the cable 12 its attached, the body portion 14 being physically similar in contour to an inverted airfoil and, therefore, having the property of creating negative lift when towed. The body portion 14 is provided with a pair of rudder members 15 braced by a bar 16 (FIG. 3), the rudder assembly being for the purpose of causing the hydrofoil to maintain its heading in the direction in which it is towed. When towed, the body portion 14 produces sufficient downward force so that the cable 12 remains within about 20° of vertical, even though the towing speed may change somewhat, by reason of the fact that the lift and drag forces acting on the hydrofoil are much greater than its buoyancy and, since both the lift and drag change in proportion to the speed of towing, the angle which the cable 12 makes to the vertical will remain substantially constant. Thus the distance of the hydrofoil from the bottom of the body of water does not vary greatly as the speed of towing varies, and the hydrofoil will not exceed its maximum range of detection with respect to the body to be detected.

Mounted within the body portion 14 of the hydrofoil is a primary coil 17 and two secondary coils 18 and 19 respectively. In the preferred form, each coil is about three feet square (see FIG. 4), the primary coil being provided with 250 turns of No. 18 wire and each of the secondary coils being composed of 5,000 turns of No. 34 wire. Each coil is provided with an insulating cover, the primary coil 17 being molded in a frame 21 made of a plastic material and the secondary coils 18 and 19 being similarly molded into frames 22 and 23. If desired, wooden frames may be employed for supporting the primary and secondary coils although the use of wood may lead to inaccuracies due to warping thereof. The frames 22 and 23 are adjustable with respect to the frame 21 for a purpose to be hereinafter disclosed. The terminal connections of the primary and secondary coils are connected to the vessel 11 through an insulated electrical conducting cable 24, the cable 24 being either wound around the towing cable 12, constructed integral therewith or being separate from the towing cable 12. The attachment of the cable 12 to the hydrofoil 10 by means of eye bolts 9 is arranged in any manner suitable for towing the hydrofoil 10 on a horizontal keel.

Figure 3:
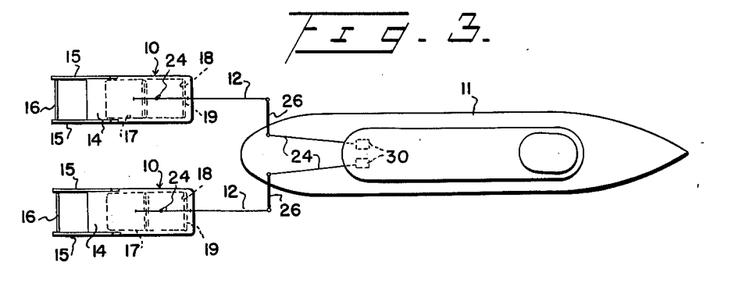
FIG. 3 is a plan view of a vessel showing an arrangement for towing at least two hydrofoils.

If it is desired to simultaneously sweep a large area of the body of water for the purpose of locating an object submerged therein, the apparatus of FIG. 3 may be employed. In this figure is shown a plurality of hydrofoils 10 towed by the vessel 11 along parallel paths by means of booms 26 to which are attached the respective towing cables 12, the coil energizing and receiving equipment indicated generally by the numeral 30 being arranged on the vessel and connected to the hydrofoils by the cable 24. While only two hydrofoils are illustrated in FIG. 3, a larger number may obviously be towed to sweep a still greater area of the bed of the body of water, the system of FIG. 9 to be described hereinafter being arranged for use with five hydrofoils.

Figure 4:
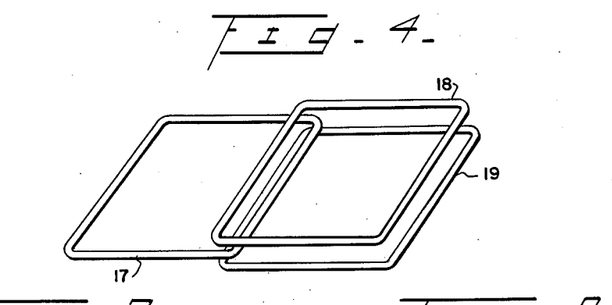
FIG. 4 is a view in perspective showing the configuration of the primary and secondary coils and the manner in which they are arranged with respect to each other.
Figure 5:
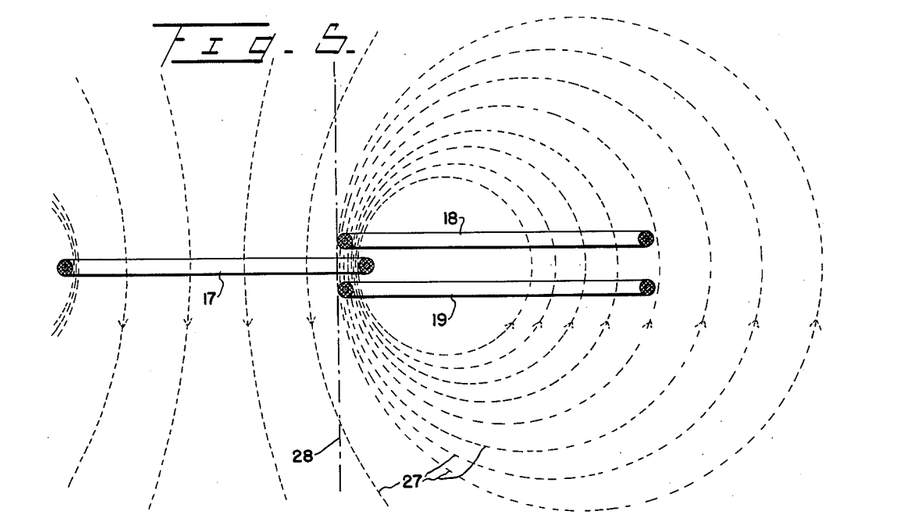
FIG. 5 is a sectional view of the primary and secondary coils illustrating the manner in which the primary flux links the secondary coils before the secondary coils have been adjusted to their final positions with respect to the primary coil.
Figure 6:
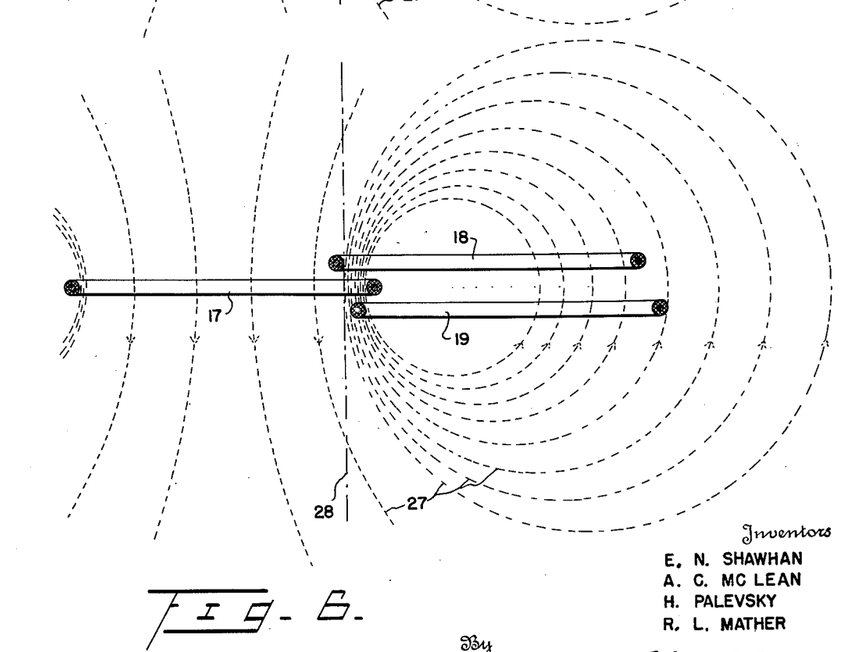
FIG. 6 is a view similar to FIG. 5 and illustrating the flux linkages after the secondary coils have been adjusted to their final positions with respect to the primary coil.

The particular manner in which the primary coil 17 and the secondary coils 18 and 19 are arranged with respect to each other will become apparent by reference to FIGS. 4, 5 and 6 and the following discussion thereof. The secondary coils 18 and 19 are placed in planes parallel to the plane of the primary coil 17 and in overlapping relation therewith as shown diagrammatically in FIG. 4 and in section in FIGS. 5 and 6. Let it be assumed that the primary coil is producing a primary pulsating magnetic field illustrated by the dotted flux lines 27 in FIGS. 5 and 6. Let it further be assumed that the primary magnetic field has an instantaneous direction as indicated by the arrow heads on the flux lines 27. Referring now to FIG. 5, if the secondary coils are placed in overlapping relation with the primary coil by a small amount, a position will be found as indicated by the dot-dash line 28 in which there is zero net linkage of the primary field with the secondary coils, as the same number of lines of flux pass upwardly through each coil as pass downwardly therethrough. The dot-dash line 28 is called the "theoretical null pick-up position" for the reason that it can not be obtained in actual practice although it may be so closely approached that only a very small voltage will appear in each secondary coil.

The primary pulsating magnetic field 27 will induce currents in the surrounding water, which is an electrically conductive fluid, and in any metallic body which it permeates such as, for instance, the body 13 shown in FIG. 1. The induced currents produce secondary magnetic fields in the water and in the metallic body which secondary magnetic fields link the secondary coils 18 and 19 and produce voltages therein. If the secondary coils are connected additively with respect to the voltages generated therein by the secondary magnetic fields, the summation of these induced voltages will greatly increase the sensitivity of the coil arrangement over what it would be if these voltages were in opposition.

While the arrangement of FIG. 5 is satisfactory, it is difficult to maintain the secondary coils in or very close to the null pick-up position when the hydrofoil is subjected to the shocks of normal usage. If the secondary coils are both displaced from the null pick-up position illustrated by the dot-dash line 28 to positions on the same side of the null pick-up position by such shocks, it will be seen that the primary magnetic field will link the secondary coils 18 and 19 so that the induced voltages therein are added in series. As the primary field is much stronger than the induced secondary field, it will become impossible to distinguish the latter from the former and the arrangement will become inoperative under these conditions.

To insure that the voltages induced by the primary field will never become additive but will be in oppposition so that said voltages tend to nullify each other and produce a zero net voltage, the preferred arrangement of FIG. 6 has been devised. In this embodiment, the secondary coil 18 is displaced to the left of the null pickup position indicated by the dot-dash line 28 until, with two amperes passing through the primary coil, one volt is induced in the secondary coil 18. In a similar fashion, the secondary coil 19 is displaced to the right of the null pickup position until one volt is induced in the secondary coil 19. The plastic frames 21, 22 and 23, on which the primary and secondary coils are mounted, as hereinbefore described, are now clamped together for mounting in the hydrofoil 10. The hydrofoil is constructed of non-conducting, non-magnetic material such as wood, and will therefore not affect the flux linkage between the primary and secondary coils.

It will be seen that the net instantaneous flux linking the coil 18 to induce voltage therein is in a downward direction because of the high flux concentration at the left side of this coil and the net instantaneous flux linking the coil 19 is in an upward direction as can be seen from an inspection of FIG. 6. It is, therefore, apparent that the voltages induced in the coils 18 and 19 by the primary magnetic field produced by the coil 17 are approximately 180° out of phase with each other and very nearly cancel each other when their amplitudes are made substantially equal. However, any flux which emanates from a metallic object placed within the range of the field of the primary coil 17 will link the coils 18 and 19 in the same direction and, therefore, produce voltages which add in the manner already pointed out in connection with FIG. 5. Should a shock displace coils 18 and 19 from their positions with respect to coil 17, the voltages induced therein by the primary field will continue to be in opposition and the difference thereof will be too small to overcome the sum of the voltages induced therein by the secondary field.

It has been found that while all metallic bodies have induced therein secondary fields by the primary field 27, the phase of the secondary field with respect to the primary field will differ depending on whether the object is ferrous or non-ferrous. If the body to be detected is non-metallic, no secondary field can be induced therein by the primary magnetic field 27. However, since the sea water surrounding a non-metallic body is a conducting medium and has a secondary field induced therein by the primary magnetic field, the presence of a non-metallic body will displace a volume of conducting fluid equivalent to the volume of the non-metallic body. This will have the effect of reducing the intensity of the secondary field induced in the conducting fluid and this change in the secondary field will produce a change in the voltages induced thereby in the coils 18 and 19 which will be made manifest by the system connected to the coils 18 and 19 as will be hereinafter described. The presence of a non-conducting body has also been found to produce a phase change in the secondary field with respect to the primary field.

Figure 7:
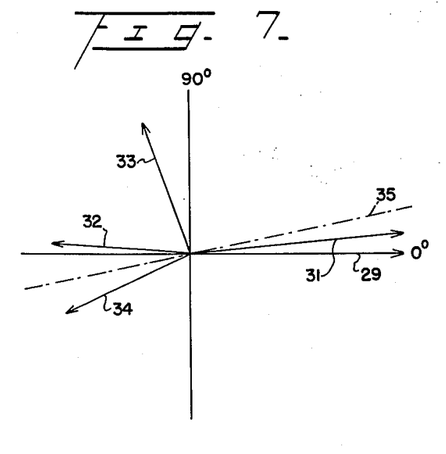
FIG. 7 is a vector diagram illustrating the phase relationships of the primary field with respect to the secondary fields induced in the secondary coils by ferrous and non-ferrous bodies and by a non-conducting body.

The vector diagram of FIG. 7 illustrates the above-mentioned phase relationships for various kinds of conducting and non-conducting objects. If the vector 29 is assumed to illustrate the phase of the primary magnetic field, experiments have shown that a non-ferrous metallic body will produce a secondary field which is almost in phase with the primary field as indicated by the vector 31 and this secondary field will be of large magnitude if the non-ferrous body is a good electrical conductor such, for example, as aluminum or copper, and has a large surface area for the circulation of eddy currents therein. If a ferrous body containing a large amount of metal concentrated in a small volume so as to have a small surface area for the circulation of eddy currents such, for example, as an iron chain, is placed in the primary magnetic field, the secondary field induced therein will be almost 180° out of phase with the primary magnetic field as indicated by the vector 32. Since iron is a relatively poor conductor when compared with aluminum or copper, the magnitude of the secondary magnetic field will be considerably smaller than that induced in aluminum or copper. If the object to be detected is a thin walled ferrous body having a large surface area such, for example, as a steel oil drum, the phase of the secondary magnetic field induced therein by the primary magnetic field will fall somewhere between 90° out of phase and 180° out of phase with the primary magnetic field as illustrated by the vector 33. The reason for this is that a steel drum or any other ferrous object having a similar configuration provides a very good electrical path for the production of eddy currents therein by the primary magnetic field and the small mass of iron tends to reduce the amount of phase lag due to the iron content. Experiment has shown that a non-conducting body will produce a secondary field having a phase angle with respect to the phase angle of the primary magnetic field somewhat as illustrated by the vector 34.

Because of the above-mentioned differences in phase relation of the induced secondary fields of the various types of objects the presence of which it is desired to detect, it is possible to design a system whereby indications may be obtained of not only the presence of any of these objects but the character thereof. Thus, if the system connected to the secondary coils 18 and 19 is provided with a phase discriminating circuit so as to be phase selective with respect to the phase of the primary field, the phase discriminating circuit may be adjusted to provide distinctive responses to the presence of different types of bodies. If it is desired to determine whether the submerged object is ferrous or non-ferrous as, for instance, when distinguishing steel case mines from aluminum case mines, the phase discriminating circuit is adjusted so that the system is out of phase with respect to the primary magnetic field by an amount indicated by the dot-dash line 35. Any object which produces a component in phase with this dot-dash line, as denoted, for instance, by the vector 31 will cause the system to give an indication in one direction whereas all other objects, such as the objects which produced the vectors 32 and 33 and 34, will cause an indication in the opposite direction.

Figure 8:
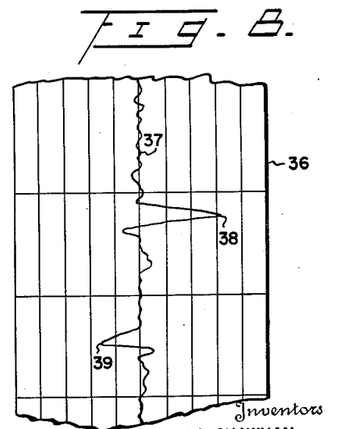
FIG. 8 is a view of a portion of a recording chart having a typical trace thereon which indicates the presence of a non-ferrous and a ferrous body.

This is more fully illustrated by FIG. 8 which shows a portion of a record chart 36 on which an indicating instrument, operatively connected to the secondary coils 18 and 19, has drawn a trace 37 of the signals produced by the secondary coils when the hydrofoil on which the secondary coils are mounted is towed above the bed of a body of water in which an aluminum body and an iron body are submerged. The deflection 38 is produced by the aluminum body and is quite large in comparison with the deflection 39 produced by the iron body, the two deflections being in opposite directions. It is obvious, therefore, that the deflections 38 and 39 correspond to the vectors 31 and 33 respectively, of FIG. 7.

Figure 9:
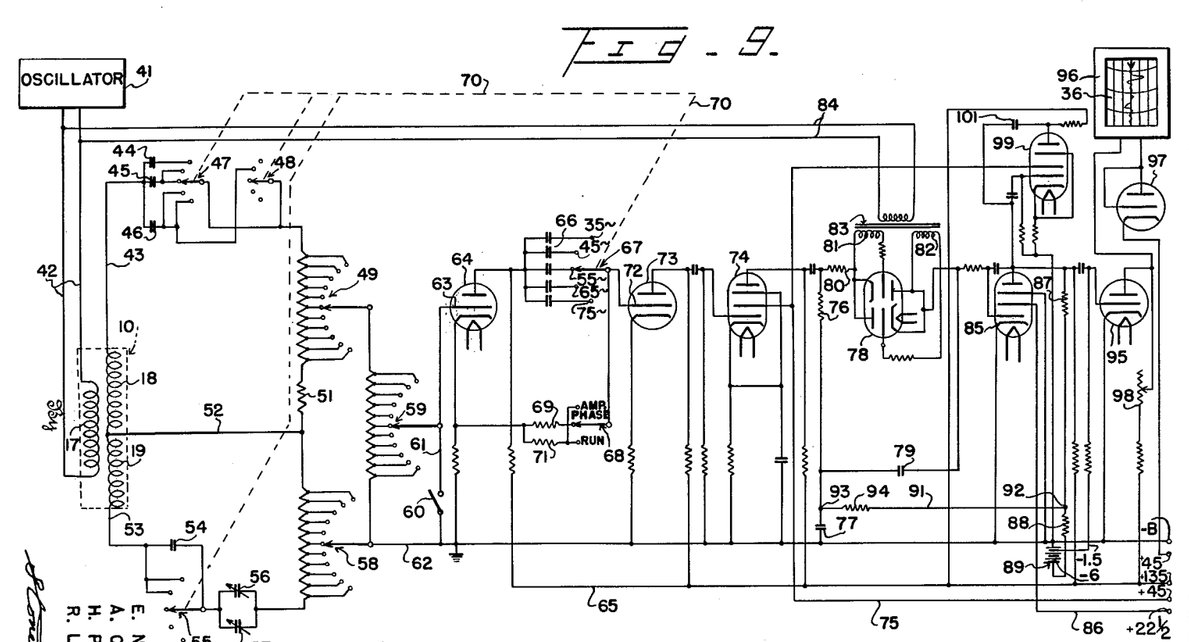
FIG. 9 is a wiring diagram of the complete system.

Referring now to FIG. 9, which shows the complete electrical system employed for detecting submerged bodies, the primary coil 17 is energized, through the connections 42, with alternating current supplied by a source 41, which may be an oscillator or any other suitable generator. While the frequency of the source 41 may range up to ten kilocycles per second for satisfactory operation, it is preferable to employ a frequency of the order of 55 cycles per second so as to reduce the attenuation of the field of the primary coil 17 by the water as the field pulses therethrough.

The secondary coil 18 has one end thereof connected by way of the lead 43 to one side of a bank of fixed condensers 44, 45 and 46 of different capacity, the other side of each condenser being adapted to be connected in the five positions of the switches 47 and 48, either singly or in combination to a variable resistance device 49 for a purpose to be hereinafter disclosed. The circuit to the other end of secondary coil 18 is completed through a resistance 51 and the lead 52. The secondary coil 19 has one end connected by a lead 53 to a fixed condenser 54 and a switch 55 connected in shunt therewith in two of its five positions. The circuit is then completed through two variable condensers 56 and 57 in parallel, a variable resistance device 58 and the lead 52 connected to the other end of the coil 19. The connections 42 and the leads 43, 52 and 53 pass through the conducting cable 24, FIG. 1, to the remaining elements of the system which are located on the vessel 11.

The variable resistance device 49 is divided into a large number of low resistance steps, the total resistance of the variable resistance device 49 and the resistance 51 being substantially equal to the total resistance of the variable resistance device 58, the latter being divided into a number of coarse resistance steps. Each of the steps of the device 58 has substantially the same resistance as the entire resistance of the device 49 so that the voltages induced in the respective coils 18 and 19 by the primary field may be very closely balanced against each other as to their amplitudes.

To adjust the phases of the voltages induced in the respective coils 18 and 19, the proper combination of fixed condensers 44, 45 and 46 to produce substantial resonance at the frequency supplied by the source 41 is placed in circuit with the coil 18 and condensers 54, 56 and 57 are arranged in circuit with the coil 19 also for the same purpose. The condenser 57 is of large capacity and the condenser 56 is of low capacity so that the condenser 57 may be adjusted in coarse steps and the condenser 56 in fine steps until the phases of the respective voltages are balanced, it being understood that various combinations of different capacity condensers for procuring the same result may be substituted for the condensers 54, 56 and 57.

Connected across the contact arms of the variable resistance devices 49 and 58 is a variable potentiometer 59. A switch 60 is connected by leads 61 and 62 whereby it may be operated to shunt the operative portion of the variable potentiometer 59, the lead 62 being connected to the grounded negative side —B of a source of supply voltage. The contact arm of the potentiometer 59 is connected to the grid 63 of a vacuum tube 64, the anode of which is connected to the positive side of the source of supply by a lead 65. To the output of the tube 64 is connected a phase shifting circuit comprising five condensers 66 of different capacity arranged to be selectively connected by a switch 67 to a contact arm 68 which may be adjusted to connect either the resistance 69 or the resistance 71 into the output circuit of the tube 64. The contact arms of the switchs 47, 48, 55 and 67 are mechanically connected together so as to be operated simultaneously through each of their five positions by means of a connection shown diagrammatically at 70 for the purpose of adjusting the capacity of the various portions of the system for use with any one of five different frequencies, as indicated on switch 67, which may be supplied from the source 41.

Connected to the contact arm of the switch 67 is the grid 72 of an amplifier tube 73, the cathode of the tube 73 being connected through the lead 62 to the negative side of the source of supply. The output of the tube 73 which receives its plate supply in a conventional manner from the lead 65, is coupled to a pentode tube 74, the latter being connected in a well known manner to the supply leads 62, 65 and 75. The output of the pentode tube 74 is coupled to a resistance 76 in series with a condenser 77. A rectifier tube 78 has its respective plate-cathode circuits oppositely connected across the resistance 76 through a condenser 79, a resistance 80 also being connected in circuit therewith. The grids of the rectifier tube 78 are energized in phase through the secondary windings 81 and 82 of a transformer 83, the primary winding of which is connected to the source 41 through the leads 84. The condensers 79 and 77 are connected in series across the input grid circuit of a pentode tube 85, the remaining grids of which are connected in a conventional manner to the leads 62 and 86. The plate of tube 85 is connected to the lead 65 which supplies plate voltage thereto.

The output of the pentode tube 85 is also connected in series across resistances 87 and 88 and to the negative side of a six volt battery 89, the positive side of which is connected to the lead 62. A feed-back connection 91 is connected to the point 92 between the resistances 87 and 88 and the point 93 between the resistance 76 and the condenser 77, and includes therein a resistance 94. The purpose and manner of operation of this feed-back connection will become apparent as the description proceeds. Also coupled to the output circuit of the pentode 85 is an amplifier tube 95, the grid circuit of which is biased by a 1.5 volt tap on the battery 89 in a conventional manner. The output of the amplifier tube 95 is connected to a recording milliammeter 96 through a rectifier 97, there being a variable resistance 98 connected in this circuit for the purpose of adjusting the initial recording position of the pen of the recorder 96. The rectifier 97 insures that no reverse current flows through the meter 96.

Also connected to the output circuit of the pentode 85 is the input circuit of a pentode tube 99 having its plate connected in the conventional manner to the supply lead 65. The output of the pentode 99 is fed back through a condenser 101 to the plate circuit of the pentode tube 85 for the purpose of suppressing any rapid transients which may appear in the plate circuit of the pentode tube 85.

The operation of the system will best be understood by reference to FIG. 9 of the drawings.

Let it be assumed that the source 41 is generating a frequency of 55 cycles per second and that the hydrofoil 10, on which the coils 17, 18 and 19 are mounted, is being towed by the vessel 11 over the bed of a body of water for the purpose of locating an object as 13 (FIG. 1). The hydrofoil is adjusted by means of the cable 12 to a point about 10 feet from the bottom of the body of water so as to keep it within effective range of the bottom and yet high enough to avoid striking any obstructions which may extend from the bottom. The mechanical connection 70 is adjusted to place in the system of FIG. 9 the proper values of condensers 44, 45, 46, 54 and 66 for the frequency generated by the source 41.

The switch 68 is now moved to its contact marked AMP, in which position the constants of the phase shifting circuit produce zero phase shift of the voltage amplified by tube 64, and the contact arms of the fine resistance device 49 and the coarse resistance device 58 are adjusted until no signal is indicated on the recording milliammeter 96. This is insured by closing switch 60 between each adjustment of the contact arms of the devices 49 and 58 as, when the switch 60 is closed, the input to the amplifier tube 64 is shorted and a zero reading is indicated on the recording milliammeter 96. When the output voltages of the secondary coils 18 and 19 are exactly balanced in amplitude by the adjustments of the contact arms of the resistance devices 49 and 58, there will be no deflection on the recording milliammeter 96 when the switch 60 is moved from closed to open position.

The switch 68 is now moved to the position marked PHASE, in which position the constants of the phase shifting circuit produce a phase shift of 90 degrees in the voltage amplified by the tube 64, for the purpose of balancing the phases of the outputs of the secondary coils 18 and 19. The phase shifting circuit is adjusted for a phase shift of 90 degrees for a reason which will become more apparent as the operation of the rectifier tube 78 and the condenser 79 is more fully disclosed. The phase balance is achieved by adjusting the fine condenser 56 and the coarse condenser 57 until no reading is observed on the milliammeter 96 when the switch 60 is moved from open to closed position and vice versa. After these adjustments have been made, the switch 60 is left in an open position and the switch 68 is moved to the position marked RUN.

The system is now in condition to be particularly sensitive to the location of objects which emanate an induced secondary field substantially in phase with the primary field such as, for instance, an aluminum case mine which produces a substantially in-phase secondary field as illustrated by the vector 31 of FIG. 7. If it is desired to render the system most sensitive to the location of any other character or object, it is merely necessary to modify the system so that in the RUN position, the proper value of resistance 71 is placed in the phase shifting circuit by the switch 68 to produce an amount of phase shift in the output voltage of the tube 64 sufficient to cause a maximum in-phase deflection of the milliammeter 96 when an object having the particular character to be detected is passed over by the hydrofoil 10.

When the vessel 11 tows the hydrofoil over an aluminum object, the secondary field emanating therefrom will link the coils 18 and 19 and upset the aforesaid balance, causing a voltage to be applied to the grid 63 of the vacuum tube 64 which will be amplified thereby and passed through the phase shifting circuit comprised of one of the condensers 66 and the resistance 71. In the present embodiment which is designed to locate aluminum objects and is the preferred form, the phase shifting circuit produces such shift in the phase of the output of the tube 64 as to cause a maximum in-phase deflection of the milliammeter 96.

The output of the phase shifting circuit is amplified by the tube 73 and the pentode 74, the output voltage of the pentode 74 being coupled through the resistances 76 and 80 and the condenser 79 to the plate-cathode paths of the rectifier tube 78. Since the grids of tube 78 are connected to the same source 41 as is the primary winding 17, the output voltage of the pentode 74, which is in phase with the voltage in the primary winding 17 for the reasons hereinbefore stated, will be in phase with the voltage on the grids of the tube 78. As the plate-cathode paths of the tube 78 are opposedly connected, only one path will be conducting during the voltage half-cycle when the grids are positive, and the condenser 79 will be charged in one direction only.

If the hydrofoil is towed over any body which produces a secondary field having a phase with respect to the primary field differing from that shown by the vector 31, such as is illustrated by any one of the vectors 32, 33 and 34, the plate-cathode paths of the rectifier tube 78 become alternately conducting because of the disparity in the phase relation of the voltages supplied to the grid and plate circuits of the tube and a net voltage appears across the condenser 79 which is easily distinguishable in its effect on the milliammeter 96 from that produced by an aluminum body. Assuming that the hydrofoil passes over a body which produces a phase shift of 90 degrees in the voltage applied to the plate-cathode paths of the rectifier tube 78 with respect to the voltage applied to the grids thereof or that a 90 degree phase shift is produced by placing the switch 68 on the contact marked PHASE when balancing the phases of the coils 18 and 19, each plate-cathode path will become conducting for equal portions of the half-cycle during which the grids are positive so that the condenser 79 will be alternately equally charged in opposite directions and will have no net voltage appearing thereacross. If the submerged body produces a phase shift of other than 90 degrees, the condenser 79 will be charged in one direction to a higher voltage than in the opposite direction by reason of one plate-cathode path being conducting for a greater part of the half-cycle during which the grids are positive than is the other plate-cathode path and a net voltage of one polarity or the other will appear thereacross to subsequently produce an indication on the milliammeter 96 in one direction or the other as shown in FIG. 8 at 38 and 39.

The condenser 79 is connected in series with the condenser 77 to the input of the pentode tube 85 and, to insure that the system will not respond to long period transients, the feed-back connection 91 is provided between the output of the pentode 85 and the input thereof. The feed-back connection 91 operates to place a voltage on the condenser 77 in opposition to the voltage placed by the long period transient on the condenser 79 and thus nullifies the effect thereof, the resistor 94 in the feed-back connection 91 and the condenser 77 having a time constant such that a short period signal will not charge the condenser 77. It is, therefore, clear that only a signal having a sudden rise will produce a sufficient voltage change on the condenser 79 which will not be affected by the slow changes in opposition voltage placed on the condenser 77 by reason of the long period time constant of the feed-back connection.

When two or more hydrofoils are to be towed by the vessel 11 to cover a large area of the bed of the body of water as illustrated in FIG. 3, it is necessary to prevent cross pickup between the respective systems connected thereto from having deleterious effects. This is accomplished by connecting the system employed with each hydrofoil to a source 41 of pulsating voltage which differs in frequency from the frequency of the source connected to any other system, the mechanical connection 70 of each system being operated to place the contact arms 47, 48, 55 and 67 on a setting which will insert the proper constants in the system to produce efficient operation at the selected frequency. As indicated on the switch 67 of FIG. 9, each system is designed to be operated at any one of five frequencies separated by ten cycle steps.

Any pulsating voltage, other than that supplied to a particular system by its source of supply 41, which appears in the system will produce a beat frequency across the circuit including the condenser 79, the resistance 80 and the rectifier tube 78. By properly selecting the values of the resistance 80 and the condenser 79, the time constant of this circuit is made high thereby to attenuate the beat frequency to such an extent as to substantially nullify it. However, to further insure that cross pickup will not produce false indications in the various systems, the pentode 99 and its feed-back connection 101 is provided in each system. The input of the pentode 99 is connected to the output of the pentode 85 and will amplify any alternating current which appears in the output of the pentode 85. The amplified values of such alternating current will be fed back through the condenser 101 in opposite phase to the output circuit of the pentode 85 so as to oppose the flow of said alternating current. The direct current changes in the voltage of the condenser 79 will not be affected by the presence of the pentode 99 because the condenser 101 blocks feed-back of direct currents and will, therefore, allow direct currents to pass through the pentode 85 and be amplified by the amplifier tube 95 to appear as a deflection on the milliammeter 96 as illustrated by the chart 36.

Briefly stated in summary, the present invention contemplates the provision of a new and improved system for the detection of submerged bodies adapted to locate both metallic and non-metallic bodies whether the metallic bodies are ferrous or non-ferrous and which will indicate the character of such bodies. The system will not substantially respond to long period transients nor to alternating current frequencies other than the operating frequency and it may be arranged to respond to any particular type of submerged body. The system also includes a novel and compact detecting coil arrangement which may be easily towed through a body of water on a hydrofoil and the operation of which will not be affected by the shocks of normal usage.

Although, in accordance with the provisions of the patent statutes, this invention has been described in concrete form with reference to a preferred embodiment thereof which gives satisfactory results, it will be understood that this form is merely illustrative and that the invention is not limited thereto since alterations and modifications will readily suggest themselves to persons skilled in the art without departing from the true spirit of this invention or the scope of the annexed claims.

The invention herein described and claimed may be manufactured and used by or for the Government of the United States of America for governmental purposes without payment of any royalties thereon or therefor.

What is claimed as new and desired to be secured by Letters Patent of the United States is:

1. In a device for detecting a transient magnetic flux, a source of pulsating magnetic flux, a pair of interconnected pick-up coils arranged so that one coil is more closely coupled to the source of pulsating flux than is the other and said coils have opposing and substantially equal voltages induced therein by said pulsating flux and adding voltages induced therein by said transient flux, and electroresponsive means connected to said coils.

2. In a device for detecting a transient magnetic flux, a primary coil, a source of pulsating voltage for energizing said primary coil, a pair of interconnected secondary coils arranged so that one secondary coil is more closely coupled to the primary coil than is the other and said secondary coils have opposing and substantially equal voltages induced therein by said primary coil and adding voltages induced therein by said transient flux, and electroresponsive means connected to said secondary coils.

3. In a device for detecting a transient magnetic flux, a primary coil, a source of pulsating voltage for energizing said primary coil, a pair of interconnected secondary coils arranged on opposite sides respectively of the null pick-up position of the secondary coils with respect to the primary coil whereby said secondary coils have opposing and substantially equal voltages induced therein by said primary coil and adding voltages induced therein by said transient flux, and electroresponsive means connected to said secondary coils.

4. In a device for detecting a transient magnetic flux, a primary coil, a source of pulsating voltage for energizing said primary coil, a first secondary coil arranged with its plane substantially parallel to the plane of the primary coil and on one side of the null pick-up position of the secondary coil with respect to the primary coil, a second secondary coil arranged with its plane substantially parallel to the plane of the primary coil and on the opposite side of the null pick-up position, said secondary coils being interconnected whereby said secondary coils have opposing voltages induced therein by said primary coil and adding voltages induced therein by said transient flux, means for adjusting the circuit, said secondary coils whereby the voltages induced therein are substantially equal, and electroresponsive means connected to said secondary coils.

5. In a device for detecting a transient magnetic flux, a primary coil, a source of pulsating voltage for energizing said primary coil, a pair of interconnected secondary coils arranged on opposite sides respectively of the primary coil with the planes thereof substantially parallel to the plane of the primary coil, said secondary coils being located on opposite sides respectively of the null pick-up position of the secondary coils with respect to the primary coil whereby said secondary coils have opposing and substantially equal voltages induced therein by said primary coil and adding voltages induced therein by said transient flux, and electroresponsive means connected to said secondary coils.

6. In a device for detecting a transient magnetic flux, a primary coil, a source of pulsating voltage for energizing said primary coil, a pair of interconnected secondary coils arranged in substantial axial alinement with the planes thereof substantially parallel to the plane of the primary coil, said secondary coils being located on opposite sides of the null pick-up position of the secondary coils with respect to the primary coil whereby said secondary coils have opposite and substantially equal voltages induced therein by said primary coil and adding voltages induced therein by said transient flux, and electroresponsive means connected to said secondary coils.

7. In a device for detecting an electrically conductive body, a primary coil, a source of pulsating current for energizing said primary coil whereby a primary magnetic field is produced which includes a secondary magnetic field in said conductive body, a pair of interconnected secondary coils arranged on oposite sides respectively of the null pick-up position of the secondary coils which respect to the primary coil whereby said secondary coils have opposing voltages induced therein by said primary magnetic field and adding voltages include therein by said secondary magnetic field, means for adjusting the circuit of said secondary coils whereby the voltages induced therein by the primary magnetic field are substantially equal, and electroresponsive means connected to said second coils.

8. In a device for detecting the presence of electrically non-conductive bodies in a conducting fluid, a primary coil immersed in said fluid, a source of pulsating current for energizing said primary coil whereby a primary magnetic field is produced which induces secondary magnetic fields in said conducting fluid, a pair of interconnected secondary coils immersed in said fluid and arranged on opposite sides respectively of the null pick-up position of the secondary coils with respect to the primary coil whereby said secondary coils have opposing and substantially equal voltages induced therein by said primary magnetic field and adding voltages induced therein by said secondary magnetic fields, and electroresponsive means connected to said secondary coils.

9. In a device for detecting the presence of electrically conductive and non-conductive bodies in a conducting fluid, a primary coil immersed in said fluid, a source of pulsating current for energizing said primary coil whereby a primary magnetic field is produced which induces secondary magnetic fields in the electrically conductive bodies and the conducting fluid, a pair of interconnected secondary coils immersed in said fluid and arranged on opposite sides respectively of the null pick-up position of the secondary coils with respect to the primary coil whereby said secondary coils have opposing and substantially equal voltages induced therein by said primary magnetic field and adding voltages induced therein by said secondary magnetic fields, and electroresponsive means connected to said secondary coils.

10. In a system for detecting the presence of electrically conductive and non-conductive bodies immersed in a conducting fluid, a hydrofoil adapted to be towed through said fluid, a primary coil mounted on the hydrofoil, a source of pulsating current for energizing said primary coil whereby a primary magnetic field is produced which induces secondary magnetic fields in the electrically conductive bodies and the conducting fluid, a pair of interconnected secondary coils mounted on said hydrofoil and arranged on opposite sides respectively of the null pick-up position of the secondary coils with respect to the primary coil whereby said secondary coils have opposing voltages induced therein by said primary magnetic field and adding voltages induced therein by said secondary magnetic fields, means for adjusting the circuit of said secondary coils whereby the voltages induced therein by the primary magnetic field are substantially equal, and electroresponsive means independent of said hydrofoil and operatively connected to said secondary coils.

11. In a device for detecting the presence of electrically conductive and non-conductive bodies immersed in a conducting fluid, a plurality of hydrofoil adapted to be towed in spaced relation through said fluid so as to sweep a wide area thereof, a plurality of alternating current sources each having a plurality of different predetermined frequencies, said plurality of hydrofoils comprising a plurality of primary coils mounted thereon respectively and adapted to be connected successively and at will to said plurality of sources so as to be energized at different frequencies whereby a plurality of primary magnetic fields of different frequencies are produced which induce secondary magnetic fields in the electrically conductive bodies and the conducting fluid, a pair of interconnected secondary coils mounted on each one of said plurality of hydrofoils and arranged on opposite sides respectively of the null pick-up position of the secondary coils with respect to the primary coil individual thereto whereby said secondary coils have opposing and substantially equal voltages induced therein by said primary magnetic field and adding voltages induced therein by said secondary magnetic fields, and means operatively connected to said secondary coils and responsive only at the predetermined frequency supplied to the respective primary coil for indicating the voltages induced in said secondary coils.

12. In a system for detecting the presence of electrically conductive and non-conductive bodies immersed in a conducting fluid, a hydrofoil adapted to be towed through said fluid, a primary coil mounted on the hydrofoil, a source of pulsating current for energizing said primary coil whereby a primary magnetic field is produced which induces secondary magnetic fields in the electrically conductive bodies and the conducting fluid, a pair of interconnected secondary coils mounted on said hydrofoil and arranged on opposite sides respectively of the null pick-up position of the secondary coils with respect to the primary coil whereby said secondary coils have opposing voltages induced therein by said primary magnetic field and adding voltages induced therein by said secondary magnetic fields, means for the adjusting the circuit of said secondary coils whereby the voltages induced therein by the primary magnetic field are substantially equal and 180 degrees out of phase, and electroresponsive means independent of said hydrofoil and operatively connected to said secondary coils.

13. In a system for detecting the presence of electrically conductive and non-conductive bodies immersed in a conducting fluid, a hydrofoil adapted to be towed through said fluid, a primary coil mounted on the hydrofoil, a source of pulsating current for energizing said primary coil whereby a primary magnetic field is produced which induces secondary magnetic fields in the electrically conductive bodies and the conducting fluid, a pair of interconnected secondary coils mounted on said hydrofoil and arranged on opposite sides respectively of the null pick-up position of the secondary coils with respect to the primary coil whereby said secondary coils have opposing voltages induced therein by said primary magnetic field and adding voltages induced therein by said secondary magnetic fields, means for adjusting the circuit of said secondary coils whereby the voltages induced therein by the primary magnetic field are substantially equal and 180 degrees out of phase, said means comprising fine and coarse adjustable resistances and fine and coarse adjustable capacitances independent of said hydrofoil and connected in circuit with said secondary coils, and electroresponsive means connected to said circuit.

14. In a system for detecting the presence of electrically conductive and non-conductive bodies immersed in a conducting fluid, a hydrofoil adapted to be towed through said fluid, a primary coil mounted on the hydrofoil, a source of pulsating current for energizing said primary coil whereby a primary magnetic field is produced which induces secondary magnetic fields in the electrically conductvie bodies and the conducting fluid, a pair of interconnected secondary coils mounted on said hydrofoil and arranged on opposite sides respectively of the null pick-up position of the secondary coils with respect to the primary coil whereby said secondary coils have opposing voltages induced therein by said primary magnetic field and adding voltages induced therein by said secondary magnetic fields, means for adjusting the circuit of said secondary coils whereby the voltages induced therein by the primary magnetic field are substantially equal and 180 degrees out of phase, adjustable phase shifting means independent of said hydrofoil and operatively connected to said secondary coils, and electroresponsive means connected to said phase shifting means.

15. In a system for detecting the presence of electrically conductive and non-conductive bodies immersed in a conducting fluid, a hydrofoil adapted to be towed through said fluid, a primary coil mounted on the hydrofoil, a source of pulsating current for energizing said primary coil whereby a primary magnetic field is produced which induces secondary magnetic fields in the electrically conductive bodies and the conducting fluid, a pair of interconnected secondary coils mounted on said hydrofoil and arranged on opposite sides respectively of the null pick-up position of the secondary coils with respect to the primary coil whereby said secondary coils have opposing voltages induced therein by said primary magnetic field and adding voltages induced therein by said secondary magnetic fields, means for adjusting the circuit of said secondary coils whereby the voltages induced therein by the primary magnetic field are substantially equal and 180 degrees out of phase, means independent of said hydrofoil and operatively connected to said secondary coils for opposing the flow of transient power frequencies in the system, and electroresponsive means connected to said last named means.

16. In a system for detecting the presence of electrically conductive and non-conductive bodies immersed in a conducting fluid, a hydrofoil adapted to be towed through said fluid, a primary coil mounted on the hydrofoil, a source of pulsating current for energizing said primary coil whereby a primary magnetic field is produced which induces secondary magnetic fields in the electrically conductive bodies and the conducting fluid, a pair of interconnected secondary coils mounted on said hydrofoil and arranged on opposite sides respectively of the null pick-up position of the secondary coils with respect to the primary coil whereby said secondary coils have opposing voltages induced therein by said primary magnetic field and adding voltages induced therein by said secondary magnetic fields, means for adjusting the circuit of said secondary coils whereby the voltages induced therein by the primary magnetic field are substantially equal and 180 degrees out of phase, means independent of said hydrofoil including a feed-back circuit for eliminating long period transients and operatively connected to said secondary coils, and electroresponsive means connected to said last named means.

17. In a system for detecting the presence of electrically conductive and non-conductive bodies immersed in a conducting fluid, a hydrofoil adapted to be towed through said fluid, a primary coil mounted on the hydrofoil, a source of pulsating current for energizing said primary coil whereby a primary magnetic field is produced which induces secondary magnetic fields in the electrically conductive bodies and the conducting fluid, a pair of interconnected secondary coils mounted on said hydrofoil and arranged on opposite sides respectively of the null pick-up position of the secondary coils with respect to the primary coil whereby said secondary coils have opposing voltages induced therein by said primary magnetic field and adding voltages induced therein by said secondary magnetic fields, a fine resistance connected in series with a fixed condenser across one of said secondary coils, a coarse resistance connected in series with a pair of parallel connected adjustable condensers across the other of said secondary coils, adjustable taps on each of said resistances, a variable phase shifting network connected to said taps through a variable potentiometer, a circuit comprising a pair of oppositely connected anode-cathode paths in parallel with each other and in series with a condenser, said circuit being operatively connected to the output of said phase shifting network, control grids in said anode-cathode paths connected in phase to said source of pulsating current, and an indicating instrument operatively connected across said condenser.

18. In a device for detecting a transient magnetic flux, a source of pulsating magnetic flux, interconnected pick-up means arranged to have voltages induced therein by said pulsating flux and said transient flux, means for adjusting the circuit of said pick-up means whereby the voltage induced therein by the pulsating flux is substantially zero, a phase discriminating circuit operatively connected to said pick-up means, and an indicating instrument operatively connected to said phase discriminating circuit.

19. In a device for detecting a transient magnetic flux, a source of pulsating magnetic flux, a pair of interconnected pick-up coils arranged to have voltages induced therein by said transient flux, means for adjusting the circuit of said coils whereby the voltage induced therein by the pulsating flux is substantially zero, a phase discriminating circuit operatively connected to said coils, and an indicating instrument operatively connected to said phase discriminating circuit.

20. In a device for detecting an electrically conductive body, a primary coil, a source of pulsating current for energizing said primary coil whereby a primary magnetic field is produced which induces a secondary magnetic field in said conductive body, a pair of interconnected pick-up coils arranged to have voltages induced therein by said secondary magnetic field, means for adjusting the circuit of said coils whereby the voltage induced therein by the primary magnetic field is substantially zero, a phase discriminating circuit operatively connected to said coils, and an indicating instrument operatively connected to said phase discriminating circuit.

21. In a device for detecting an electrically conductive body, a primary coil, a source of pulsating current for energizing said primary coil whereby a primary magnetic field is produced which induces a secondary magnetic field in said conductive body, a pair of interconnected pick-up coils arranged to have voltages induced therein by said secondary magnetic field, means for adjusting the circuit of said coils whereby the voltage induced therein by the primary magnetic field is substantially zero, a phase shifting network connected to said coils, a phase discriminating circuit operatively connected to said phase shifting network, and an indicating instrument operatively connected to said phase discriminating circuit.

22. In a device for detecting an electrically conductive body, a primary coil, a source of pulsating voltage for energizing said primary coil whereby a primary magnetic field is produced which induces a secondary magnetic field in said body, a pair of interconnected pick-up coils arranged to have voltages induced therein by said secondary magnetic field, means for adjusting the circuit of said coils whereby the voltages induced therein by the primary magnetic field are substantially equal, a phase discriminating circuit operatively connected to said coils, and an indicating instrument operatively connected to said phase discriminating crcuit.

23. In combination with a phase discriminating circuit and means for indicating the phase signal input of said circuit, a phase variable means for producing said phase signal input and having a variable phase which is selective in accordance with the magnetic quality of a medium to be detected, said phase variable means including a plurality of secondary pick-up coils electrically connected to said phase discriminating circuit and arranged in mutually overlapping relationship sufficient to produce a nulling effect therein and on the indicating means in the absence of a disturbing effect in the ambient magnetic field due to said medium, and adapted by the overlapping relationship thereof to produce an additive effect in the presence of said disturbing ambient magnetic effect, said pick-up coil ararngement being effective to produce indications on the indicating means of the qualitative and the quantitative values of the magnetic condition effect within the ambient magnetic field of the device.

References Cited in the file of this patent

UNITED STATES PATENTS

| | | |
|---|---|---|
| Re. 21,003 | Knerr et al. | Feb. 14, 1939 |
| 1,812,392 | Zuschlag | June 30, 1931 |
| 1,957,477 | Sharp et al. | May 8, 1934 |
| 2,129,058 | Hedden | Sept. 6, 1938 |
| 2,238,072 | Nelson et al. | Apr. 15, 1941 |
| 2,321,355 | Berman | June 8, 1943 |
| 2,415,789 | Farrow | Feb. 11, 1947 |